Sept. 18, 1928.  W. P. MASON  1,684,403
ELECTRICAL TESTING SYSTEM AND METHOD
Filed May 29, 1926   2 Sheets-Sheet 1
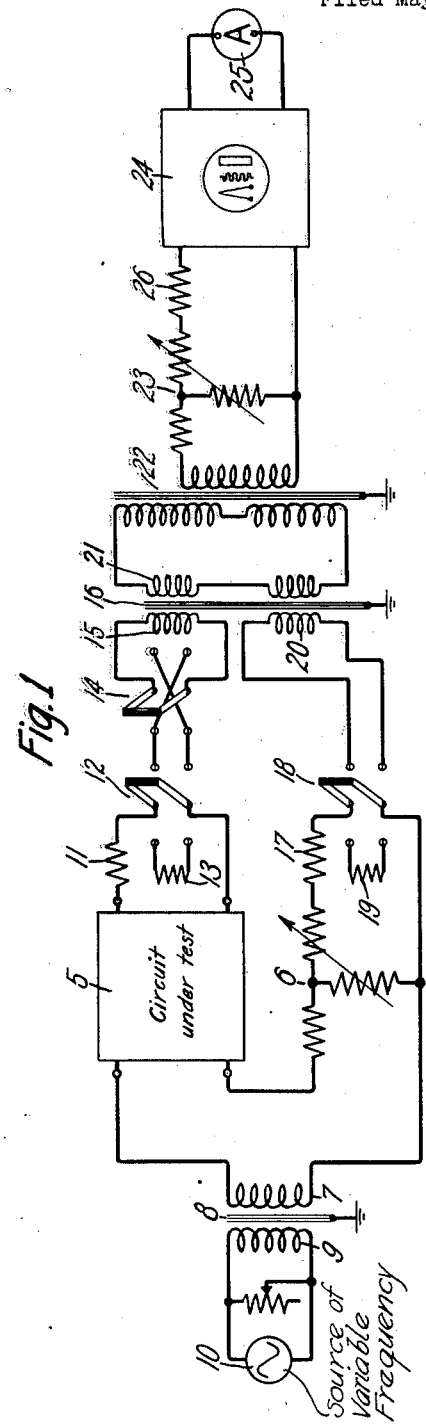
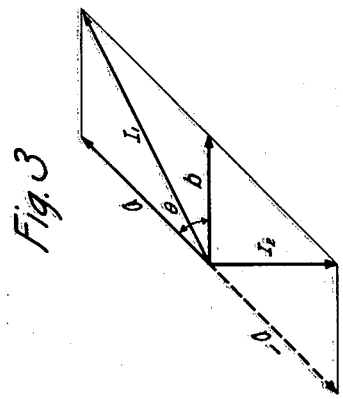
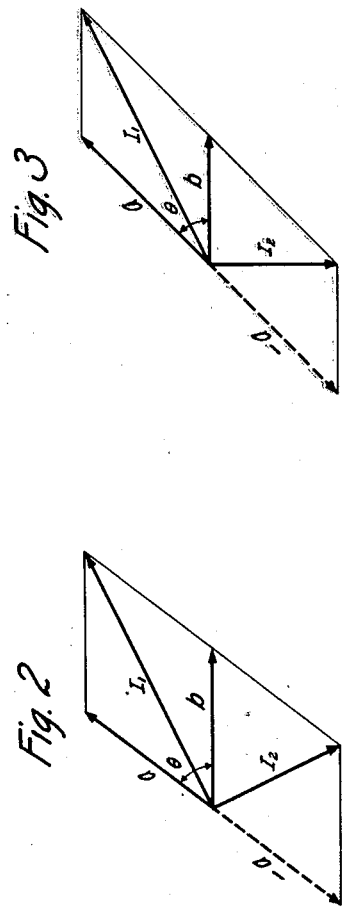
Inventor:
Warren P. Mason
by  E. V. Griggs  Atty.

Sept. 18, 1928.  
W. P. MASON  
1,684,403  
ELECTRICAL TESTING SYSTEM AND METHOD  
Filed May 29, 1926   2 Sheets-Sheet 2
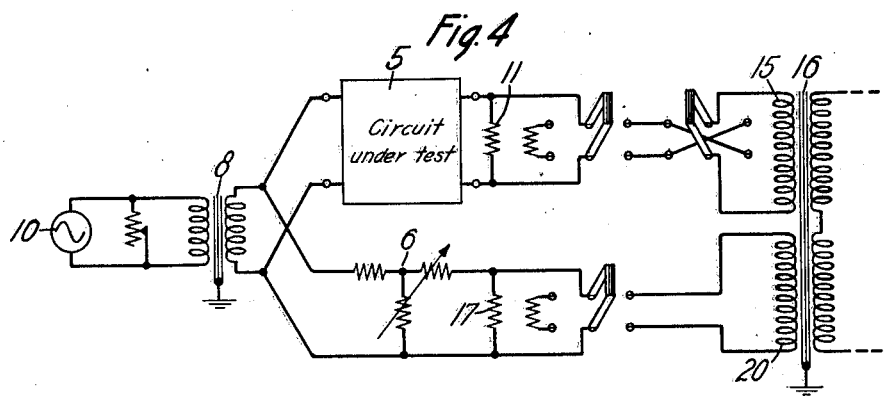
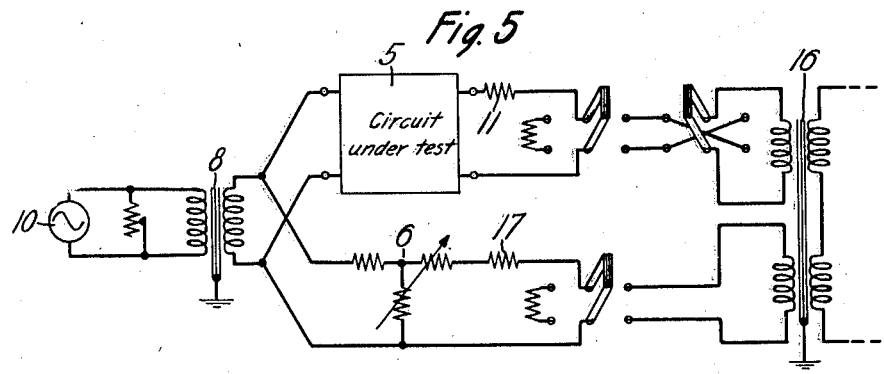
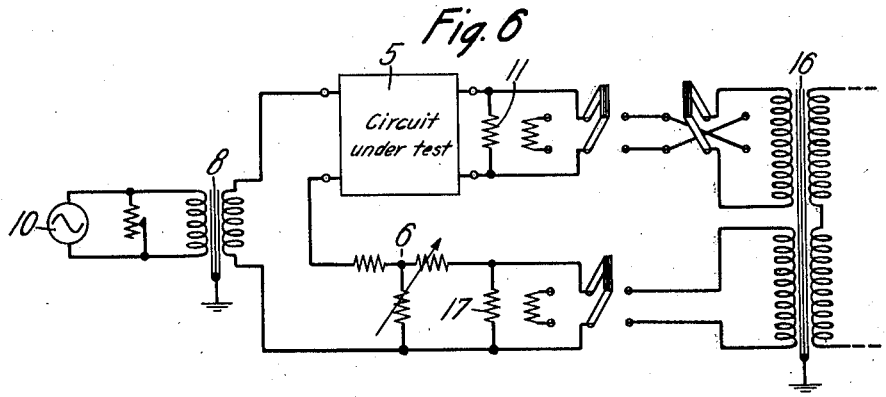
Inventor:
Warren P. Mason
by W. Griggs    Atty.

Patented Sept. 18, 1928.

1,684,403

UNITED STATES PATENT OFFICE.

WARREN P. MASON, OF EAST ORANGE, NEW JERSEY, ASSIGNOR TO WESTERN ELECTRIC COMPANY, INCORPORATED, OF NEW YORK, N. Y., A CORPORATION OF NEW YORK.

ELECTRICAL TESTING SYSTEM AND METHOD.

Application filed May 29, 1926. Serial No. 112,598.

This invention relates to electrical testing and particularly to the measuring of phase shift in electrical circuits.

An object of the invention is to simplify the measurement of characteristics of electrical circuits.

Another object of the invention is to provide a simple and accurate system for the measurement of the phase shift in an electrical circuit.

In the study and design of electrical systems, it is often desirable to measure the phase shift therein. This is particularly desirable in circuits for the transmission of multi-frequency current in wave filters and in circuits particularly design for obtaining a time delay.

In accordance with a feature of this invention the phase shift produced in a current transmitted through a network of unknown characteristics with respect to the shift produced in a network of known characteristics, can be measured by measuring the ratio of the vector sum and difference of the two currents. This can be most advantageously done by making the currents of the same amplitude and comparing the vector difference of the two currents with their vector sum.

The method of comparing the sum and difference of the currents transmitted through a network of unknown characteristics and a network of known characteristics may be found advantageous for determining characteristics other than phase shift; for example, it may be employed for measuring impedances.

This invention may be more readily understood by reference to the following detailed description in connection with the drawing in which: Fig. 1 shows one embodiment of this invention, Figs. 2 and 3 are vector diagrams illustrating the principles of operation of the invention, and Figs. 4, 5 and 6 show modifications of the circuit shown in Fig. 1.

In Fig. 1 the circuit 5 to be tested is connected in series with an artificial line 6 to the secondary winding 7 of a transformer 8, the primary winding 9 of which is connected to a source of variable frequency current 10. The circuit 5 is connected through an impedance 11 to the central terminals of a DPDT switch 12. The impedance 11 is adjusted so that the circuit 5 is terminated in the impedance into which it will work in actual use. One set of terminals of the switch 12 is connected to the impedance 13 and the other to one terminal of the reversing switch 14. The other terminal of the reversing switch is connected to one primary 15 of the three winding transformer 16. The output terminals of the line 6 are similarly connected through the terminating resistance 17 to the central terminals of the DPDT switch 18, one set of terminals of which is connected to the impedance 19 and the other to the other primary winding 20 of the transformer 16. The resistances 13 and 19 are provided to present the same impedance as is presented by the primary windings of the transformer 16. The secondary winding 21 of the transformer 16 is connected through a second transformer 22 to an artificial line 23, the output terminals of which are connected through a terminating resistance 26 to the vacuum tube amplifier rectifier 24, the output terminals of which are connected to a meter 25. Resistances 17 and 26 are given such values that the impedances of the circuits in which the lines 6 and 23 terminate are equal to the respective characteristic impedances of the lines.

It is necessary, in order to make accurate measurements, that the phase shifts in the two halves of the transformer 16 should be equal.

The circuit described above is adapted for measuring current phase shift and the impedances of the primary windings 15 and 20 should be small compared to the terminating impedances of the circuits 5 and 6.

The operation of the circuit is as follows: With the switch 12 in the right hand position and the switch 18 in the left hand position the value of the current in the output of the circuit 5 is indicated on the meter 25. By throwing the switches in the opposite positions the output of the artificial line 6 is indicated on the meter. The attenuation of the line 6 can then be adjusted until the amplitude of the output current is equal to the amplitude of the current in the output of the circuit 5. The two currents acting alone will then produce the same deflection on the meter 25. This operation corresponds to the usual method of measuring loss and if the line 6 is calibrated it may be read to give the loss in the circuit 5. By throwing the arms of both the switches 12 and 18 into the right hand positions and the reversing switch 14 in the left hand position, the vector sum of the two equal currents will be indicated on the meter 25. By reversing the switch 14, the vector difference of the two equal currents will be indicated on the meter. With the reversing switch 14 in a position giving the larger reading on the meter 25 the calibrating line 23 may be adjusted to produce sufficient attenuation to give the same reading on the meter as was obtained with the reversing switch in the other position and the line 23 cut out. The phase angle between the two currents can then be determined by the amount of line inserted.

Since the inputs of the circuit 5 and artificial line 6, which is a pure resistance network, are in series, the current output of the artificial line will be in phase with the current input to the circuit 5. Let $I_s$ be the current input to the circuit and artificial line and let $a$ and $b$ be the current outputs of the circuit and artificial line, respectively. Then:

$$a = \rho I_s \lfloor \theta$$

and $b = \rho' I_s$. The first transformer and each of the succeeding pieces of apparatus will attenuate $a$ and $b$ the same amount and their relative phase will be unchanged by the apparatus between the first transformer and the amplifier rectifier. If the artificial line 6 is adjusted to give the same attenuation as the circuit 5, then $\rho = \rho'$ and $$|a| = |b|$$

The currents into the amplifier rectifier input then may be designated as $$a' \lfloor \theta$$

and $b'$ where both currents are referred to $b'$.

From which it can be seen by reference to Fig. 2 that the phase shift of the network is:

$$\theta = 2\cos^{-1}\frac{\overline{(\text{vector sum of } a' \text{ and } b')}}{\sqrt{(\text{vector sum of } a' \text{ and } b')^2 + (\text{vector difference of } a' \text{ and } b')^2}}$$

or $$\theta = 2\cos^{-1}\frac{I_1}{\sqrt{I_1^2 + I_2^2}} = 2\cos^{-1}\frac{1}{\sqrt{\frac{I_2^2}{I_1^2}+1}} = 2\cos^{-1}\frac{1}{\sqrt{1+\alpha^2}} \quad (1)$$

if $I_1 > I_2$, where $I_1$ is the vector sum of $a$ and $b$ and $I_2$ the vector difference as indicated in Fig. 2 and $\alpha$ is $$\left|\frac{I_2}{I_1}\right|$$

and is equal to the current attenuation corresponding to the number of miles of line inserted in calibrating line 23 to reduce $I_1$ to the same magnitude as $I_2$.

Now, if the network contains an amplifier so that there is an overall gain the phase shift may be measured by altering the circuit to the left of the transformer 16 to the form of a gain measuring circuit by placing the line 6 in tandem with the network 5, or the phase shift may be measured with the same arrangement by use of the modified formula given below.

Referring to Fig. 3 let $(a)$ be the current input to the amplifier rectifier due to the current output of the network and let $(b)$ be the current in the input to the amplifier rectifier due to the artificial line output. Then from the figure, if $\theta$ is the phase angle:

$$I_1^2 = a^2 + b^2 + 2ab\cos\theta$$

and $$I_2^2 = a^2 + b^2 - 2ab\cos\theta$$

where $I_1$ and $I_2$ are the aiding and the opposing values respectively.

Let $$|a| = K_1|b|$$

where $$K_1 = \left|\frac{a}{b}\right| =$$

amplification constant corresponding to the number of miles of line it is necessary to insert in calibrating line 23 to make $(a)$ equal in magnitude to $(b)$. Substituting $$|a| = K_1|b|$$

we have:

$$I_1^2 = b^2[1 + K_1^2 + 2K_1\cos\overline{\theta}]$$

$$I_2^2 = b^2[1 + K_1^2 - 2K_1\cos\overline{\theta}]$$

Let $$|I_1| = K_2|I_2|$$

Where $$K_2 = \left|\frac{I_1}{I_2}\right| =$$

amplification constant corresponding to the number of miles of line inserted in calibrating line 23 to make $I_1$ equal in magnitude to $I_2$. Substituting this in the above equations and solving for $\theta$, we have:

$$\theta = \cos^{-1}\left(\frac{K_2^2-1}{K_2^2+1}\right) \times \frac{K_1^2+1}{2K_1} \quad (2)$$

but since:

$$\cos\theta = 2\cos^2\frac{\theta}{2} - 1$$

it follows from equation (1) that $$\cos \theta = \frac{I_1^2 - I_2^2}{I_1^2 + I_2^2} \times \frac{K_2^2 - 1}{K_2^2 + 1}$$

which is the equivalent of equation (1). Rewriting equation (3)

$$\cos \theta = \left\{\frac{K_2^2 - 1}{K_2^2 + 1}\right\} \times \left\{\frac{K_1^2 + 1}{2K_1}\right\}$$

That is to say, if the phase shift of an amplifying network is being measured and the current output of the network exceeds its input current (the current through artificial line 6 with no attenuation) by $n$ miles, which corresponds to an amplification constant of $K_1$, the cosine of the phase angle is $$\left\{\frac{K_1^2 + 1}{2K_1}\right\}$$

times the value of the cosine corresponding to the reading of the calibrating line 23 for equal currents through both branches. Whence, if the aiding value is the larger, we may write:

$$\theta = \cos^{-1} \frac{1 - \alpha^2}{1 + \alpha^2} \times \frac{K_1^2 + 1}{2K_1} \quad (3)$$

in which $\alpha$ is the attenuation constant corresponding to the line inserted in calibrating line 23 to decrease the aiding current to the same value as the opposing, and $K_1$ is the ratio of the current output of the network arm to the current output of the artificial line 6.

$K_1$ is determined by the amount of calibrating line 23 it is necessary to insert in series with the amplifier network 5 in order to get the same reading in the meter 25, as when the arm containing the line 6, set for no attenuation, is connected thereto.

Fig. 4 shows a modification of the circuit of Fig. 1 for measuring voltage phase shift. In this arrangement the circuit 5 and the line 6 are connected in parallel to the source 10 so as to receive equal voltages therefrom, and the termination resistances 11 and 17 are connected in shunt to the circuit 5 and the line 6 respectively. In other respects the arrangement of this circuit is the same as that of Fig. 1; however, for this type of circuit the impedances of the primary windings 15 and 20 should be high compared to the terminating impedances of the circuit 5 and line 6.

This circuit may be used for measuring impedances. Thus if the circuit 5 is a simple impedance and a variable resistance is substituted for the line 6, the value of the impedance may be determined from the amount of resistance inserted at 6 and the phase angle may be determined from the setting of the line 23, in the usual manner.

Fig. 5 shows a circuit for measuring the phase shift of the received current with respect to the impressed voltage. In this circuit the circuit 5 and line 6 are connected in parallel to the source 10 as in Fig. 4, the resistances 11 and 17 are connected in series in the output circuits and a low impedance transformer is used as in Fig. 1.

Fig. 6 shows a circuit for measuring the phase shift of the received voltage with respect to the input current. Here the circuit 5 and line 6 are connected in series to the source 10, and the resistances 11 and 17 are connected in shunt and a high impedance transformer 16 is used as in Fig. 4.

What is claimed:

1. The method of measuring the phase shift in an electrical circuit which comprises transmitting an electrical wave therethrough and through a network having a known phase shift and determining the phase shift from the relation of the vector difference and the vector sum of the output currents of said networks.

2. The method of measuring the phase shift in an electrical circuit which comprises transmitting an electric wave therethrough and through a network producing the same attenuation and a known phase shift, measuring the relation of the vector difference and the vector sum of the output currents of said networks, and calculating the phase difference of said currents therefrom.

3. A phase shift measuring apparatus comprising a source of alternating current, a network having a variable attenuation, means for supplying current from said source to said network and to the apparatus to be tested, a measuring circuit, switching means for alternately connecting the outputs of the apparatus to be measured and said network to said measuring circuit, connections including other switching means for supplying to said measuring circuit the vector difference and the vector sum of the output currents of the apparatus to be tested and said network, and a second network having a variable attenuation included in said connections.

4. A phase shift measuring apparatus comprising a variable frequency source of current, a network having a variable attenuation, connections for supplying current from said source to the apparatus to be tested and to said network, a measuring circuit, a transformer having a secondary winding connected to said measuring circuit, a primary winding adapted to be connected to the output of the apparatus to be tested and a second primary winding adapted to be connected to the output of said variable attenuation network, switching means for alternately connecting the outputs of the apparatus to be tested and said network to their respective primary windings to compare the output currents, other switching means for connecting the outputs of said apparatus to be tested and of said variable attenuation network to said primary windings so as to alternately indicate in said measuring circuit the vector difference and the vector sum of the output currents of the apparatus to be tested and said network.

5. A phase shift measuring apparatus according to the preceding claim including a terminating impedance for the apparatus to be tested simulating the impedance into which said apparatus works in practice.

6. A phase shift measuring apparatus according to claim 4 in which the apparatus to be tested and the variable attenuation network are connected in series to the source of current.

7. The method of electrical testing which comprises transmitting two alternating waves of the same frequency, modifying one of said waves in accordance with an element to be tested, knowingly modifying the other of said waves, and comparing the vector sum of said voltage waves with their vector difference to determine the amount of phase shift through said element.

8. The method of electrical testing which comprises transmitting part of the energy from an alternating current source through an element to be tested, transmitting part of said energy through a network of known characteristics, and comparing the vector sum with the vector difference of the waves so transmitted to determine the amount of phase shift through said element.

9. A system of electrical testing comprising a source of testing current, a test circuit, a circuit of known characteristics, connections for impressing current from said source on said circuits, an indicating device, means for alternately impressing the sum and difference of the voltages in said circuits upon said indicating device, said device indicating said sum and difference values, and calibrated attenuating means for determining the difference in magnitude between said sum and difference values.

10. The method of measuring the phase shift through an electrical element comprising first determining a quantity involving only amplitude relations between current transmitted from a source through the element and another current from the same source transmitted around said element, and then deriving therefrom the angle of phase shift through said element.

In witness whereof, I hereunto subscribe my name this 25 day of May A. D., 1926.

WARREN P. MASON.